United States Patent

[11] 3,542,022

[72] Inventor Richard W. Bartnik
West Frankfort, Illinois
[21] Appl. No. 709,043
[22] Filed Feb. 28, 1968
[45] Patented Nov. 24, 1970
[73] Assignee Leonard J. Dunn
West Frankfort, Illinois
a part interest

[54] TEMPLATE GUIDE FOR MEDICATION INJECTION INTO GLUTEUS MEDIUS MUSCLE AREA
7 Claims, 4 Drawing Figs.

[52] U.S. Cl. .................................................. 128/215
[51] Int. Cl. ................................................... A61m 5/00
[50] Field of Search ....................................... 128/2, 215,
303, 379, 384; 33/104, 174, 174B, 180A; 132/88.5

[56] References Cited
UNITED STATES PATENTS
2,245,350 6/1941 Marshall ...................... 128/215

*Primary Examiner*—Richard A. Gaudet
*Assistant Examiner*—John B. Mitchell
*Attorney*—Clarence A. O'Brien & Harvey B. Jacobson ABSTRACT: This invention pertains to administration of injectible medications into either the left or right buttock of a prone patient. It is intended to replace uncontrolled and often haphazard planning and procedural steps wherein, for example, the site chosen for an injection is contingent almost wholly on the training and experience of an intern, nurse or aide. It seeks to establish a uniform, perhaps a standardized practice, based on unerring area identification and positive control. It has to do with a prefabricated pliant plastic template of prescribed size and marginal contour. The instructions for use are on the template and a quadrantal sight opening designates and isolates the upper outer quadrant of the selected buttock and circumscribes the site for injection. If desired, the nurse can stencil an indelible pencil line directly on the anatomy and mark the delineated area for future repetitional injections.

Patented Nov. 24, 1970

3,542,022

Richard W. Bartnik
INVENTOR.

BY *Clarence A. O'Brien*
*and Harvey B. Jacobson*
Attorneys

TEMPLATE GUIDE FOR MEDICATION INJECTION INTO GLUTEUS MEDIUS MUSCLE AREA

This invention relates to certain new and useful improvements in special purpose plotting and layout templates and has to do, more particularly, with a pliant plastic or an equivalent template which enables skilled and qualified persons, a registered nurse for example, to cope with the now uncertain task of achieving positive control during the administration of medication injections intramuscularly into a selected buttock, left or right, of a patient lying prone on a bed or requisite table.

It is a matter of common knowledge in the field of endeavor under evaluation that currently pursued practices followed when administering injectibles, that is, medication intramuscularly into buttock areas, is often uncontrolled and unsatisfactory to all concerned. Depending primarily on extent of training and experience a nurse without being reasonably sure of the exact site for injection can and often does make mistakes and injure nerves in anatomical area injected. There has long existed a recognized need for an easy to use reliable appliance which has a capability of clearly and visually designating the prescribed area and guiding the user so that nerve injury resulting from improperly injecting medication intramuscularly can be reduced to an acceptable minimum. Keeping in mind malpractice litigation and many and varied difficulties involving the physician, his personnel, patient and others, the objective, generally speaking, of the invention hereinafter revealed will become apparent.

To the ends desired the innovation herein under advisement is characterized by a simple and practical soft pliable plastic template embodying position locating and guide means for medication injections into the gluteus medius muscle area. It aids the user in pin-pointing medication injections, other than anesthesia, into the upper outer quadrant of the patient's buttocks, namely right or left aspects, and lends itself to positively controllable use by a trained or registered nurse.

Briefly, this invention comprehends a special purpose template which, unlike prior art planning and workpiece templates, is made of conformably flexible and amply pliable blank material, a plastic blank, for example. This pliant sheet or template comprises a body portion having inward and outward (proximal and distal peripheral margins) longitudinal marginal edges. The inward marginal edge is laid proximal to and alongside the fold between the left and right buttocks for initial orientation and the distal edge is generally parallel to but remote from the selected fold or buttock. The upper outer corner portion of the template is cut out to provide a quadrantal sight opening which aptly and accurately marks the spot and circumscribes the site to be injected.

As will be hereinafter more fully appreciated use of the herein disclosed template will assure the expected result and positive control with respect to administration of injectible medication intramuscularly into the buttock areas compared to present day procedures and practices. Properly used the disclosed template can, if carefully handled, reduce injuries to the nerves to a practical minimum. Experimental use has shown that the visual self-contained features can be relied upon to establish a practice of injections which will well serve the purposes of the attending physician and his duly appointed nurse.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2:
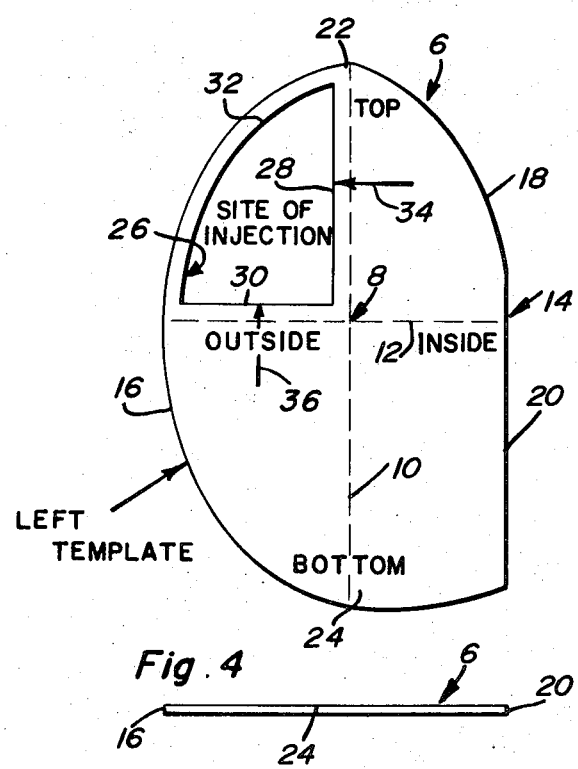
FIG. 2 is a top plan view on a slightly enlarged scale of the template illustrated in FIG. 1 and wherein descriptive legends have been added to identify the component portions and to facilitate unquestionable use by a user.
Figure 3:
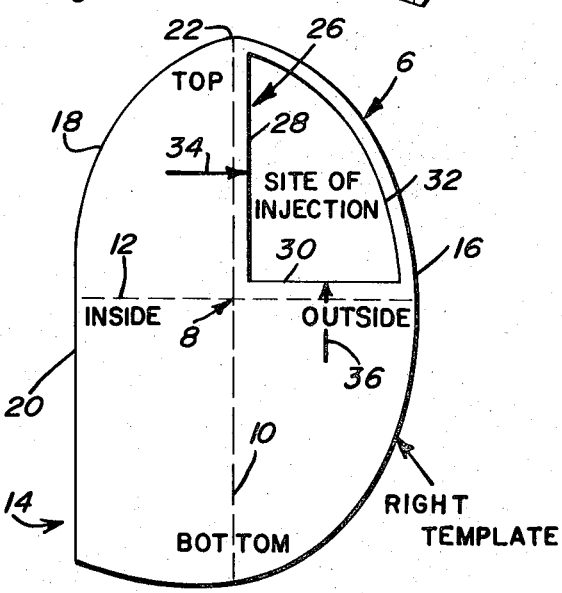
FIG. 3 is a top plan view similar to FIG. 2 and showing the right-hand template which, structurally speaking, is the same as the left-hand template.
Figure 4:
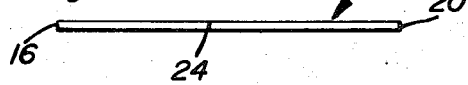
FIG. 4 is an edge view which may be said to be a view observing the bottom edge of the template shown in FIG. 2.

Inasmuch as each template is the same in construction, FIGS. 2 and 3 respectively, a description of one template will serve for all. Referring then to the left-hand template in FIG. 2 it will be noted that it is designated, as an entity, by the numeral 6. It is, substantially ovate in plan that is when spread out flat. It is made of soft pliable plastic material and may be either disposable or permanent. As is perhaps evident templates made in accordance with the invention will range in size from small to medium to large and perhaps to extra large and will be patterned for both right and left aspects of the buttocks. Observing the top, that is upwardly facing surface of the template, it will be first noted in FIG. 2 that numeral 8 designates a suitably applied cruciform design comprising a centralized longitudinal line 10 crossed at its center by a transverse line 12. This design is intended to assist the user in distinguishing the four zones and, more particularly, to quickly identify the right-hand longitudinal margin 14 and the longitudinal left-hand margin 16. It will be noted that the first named marginal edge comprises an upper arcuate half-portion 18, a lower longitudinally straight half-portion 20 thus providing a satisfactory proximal edge when the template is in use with said edge 14 positioned alongside the fold between the left and right buttocks. It will be further noted that the distal edge 16 is, when in use, positioned remote from the locale of the edge 14. The upper components of the edges 16 and 18 converge to define the top 22 which is suitably rounded and slightly pointed to facilitate quick use and to differentiate this end from the bottom 24. The upper left-hand corner portion is cut out to provide a sight opening 26 which is preferably quadrangle and therefore embodies edge portions 28 and 30 joined by an arcuate edge portion 32. This sight opening is proportional in size with the overall template and to assist the nurse in properly applying the same positioning arrows are provided as at 34 and 36.

To further emphasize the positive control use the aforementioned component portions are identified with the printed or suitably applied legends such as top, bottom, outside and inside as shown in FIG. 2.

Figure 1:
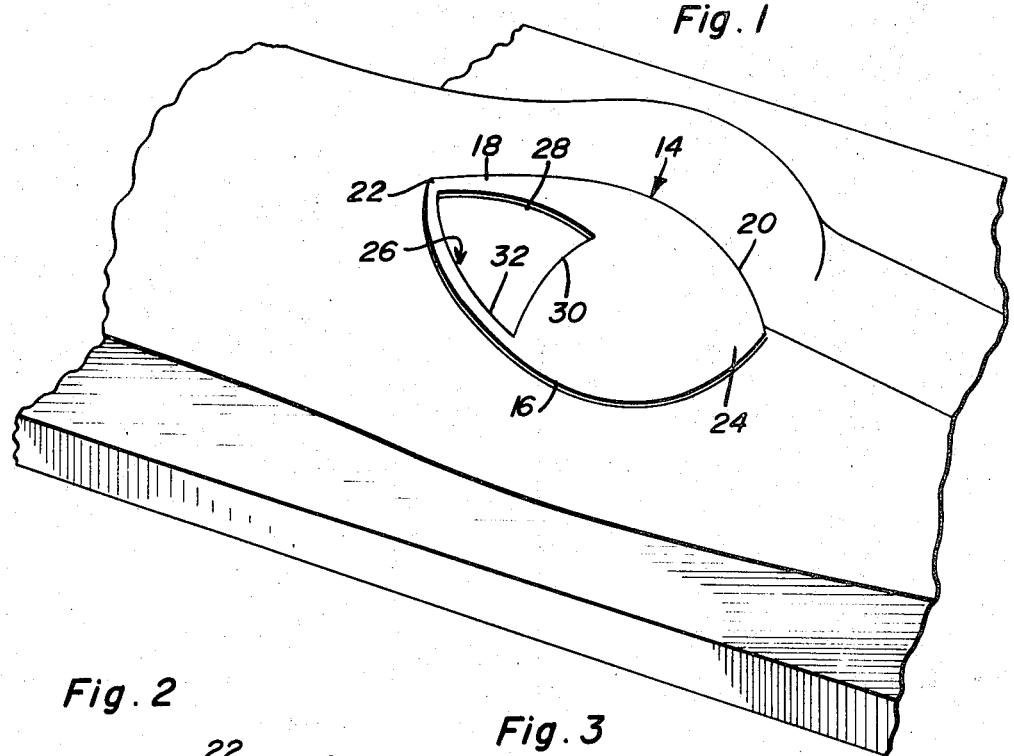
FIG. 1 is a view in perspective showing a single template, the one at the left which has been properly located on the prone patient in readiness for use by the nurse or other qualified personnel.

It will be evident that the nurse or other qualified person using this template can achieve the desired positive control result when applying the template in the manner illustrated in FIG. 1. To this end the patient should be in bed or lying in a prone position on a suitable support table with the buttocks exposed for application of the template and subsequent injection. The template used will, manifestly, depend on the particular anatomy of a given patient and will range in size from small, to medium, to large or extra large and for either right or left aspects of the buttock which is being injected.

In practice the user will place the plastic template over the selected buttock, for example, the left buttock in the manner illustrated in FIG. 1. The entire site encompassed by the margins of the sight opening must then be cleansed using cotton soaked in alcohol. The needle, not shown, is injected at a 90° angle into the site area giving medication intramuscularly according to accepted techniques.

It is also within the purview of the mode of use to employ an indelible pencil and to draw around the edges 28, 30 and 32 and to in this manner outline the area for future injections of medication according to accepted as well as aseptic techniques. It follows that the template thus constructed and used is possessed of the self-contained features for reliable and realistic results. To the ends desired the features shown and described contribute to overall satisfactory employment and use of the template in the manner shown in FIG. 1.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:

1. For use by a physician or a registered nurse, a visual plotting guide designed and adapted to aid a user thereof to accurately locate and prepare a predetermined upper outer quadrant of the buttocks, either left or right, of a given patient for medication injection into the gluteus medius muscle area comprising: a template made of flexible pliant sheet material capable of being spread conformingly atop the anatomy involved, said sheet characterized by a body portion having inward and outward longitudinal marginal edges joined by upper and lower transverse marginal edges, an upper outer corner portion of said sheet having a sight opening which when properly positioned by the user outlines, coincides with, and clearly designates the aforementioned quadrant and marks the exact site for administering the contemplated intramuscular injection, said template being of a predetermined dimension in plan measurably in keeping with the size of the buttocks area to be covered and whose marginal edges are capable of being precisely positioned and oriented with the encompassing regions of the stated area in a manner to correctly position said sight opening to circumscribe and positively identify the site of injection, the body portion proper of said sheet being imperforate, said sight opening being quadranal in plan and proportional in size relative to the overall size of the sheet and the marginal edges of said sight opening being such in stability that the nurse can use an indelible pencil, draw a line around the marginal edges of said sight opening and delineate a planned area directly on the patient's skin for future injections not requiring use of said template.

2. The template defined in and according to claim 1, and wherein said template is substantially ovate in plan, is provided with normally flat top and bottom sides, said top side having legends displayed thereon to designate, top, bottom, and inside and outside lengthwise edges, said edges coordinating with each other in a manner to assist the user in locating the template relative to the predetermined area of use, and in so doing, to provide a positive visual and uniform method of injections of medication intramuscularly in the buttock area.

3. The template defined in and according to claim 2, and wherein said inside edge has an arcuate half-portion and a straight half-portion, the entire outside edge being semicircular, and the intervening top and bottom transverse ends being arcuately rounded in plan.

4. The template defined in and according to claim 3 and wherein said sight opening is confined to the upper left-hand corner easily identifiable and positionable for use with the aid of indicating arrows.

5. A template for medication injection into gluteus medius muscle area comprising a generally ovate plastic sheet having an inside longitudinal marginal edge adapted to be associated with the fold between the respective buttocks, having an outside substantially semicircular marginal edge adapted to assume a distal position relative to said fold, having top and bottom marginal edge portions and having an upper outer corner portion provided with a sight opening which when properly positioned by a user outlines and coincides with and designates the upper outer quadrant of the buttock with which it is associated, in a manner to mark the exact site for administering an intramuscular injection.

6. The template defined in and according to claim 5 and wherein said template has an upwardly facing surface provided with descriptive legends indicative of the top, bottom, inside and outside marginal portions and to assist the user in localizing and lining up the position of the template as a step preparatory to using said sight opening.

7. The template defined in and according to claim 6, said template characterized by an imperforate body portion, said sight opening being quadrantal in plan and proportional in size relative to the overall size of the template and the marginal edges of said sight opening being amply stable that the user can, with the aid of an indelible pencil, trace a line around the marginal edges of the sight opening, and in so doing, delineate a planned area directly on the patient's skin for future injections not requiring the use of the template.